US009500786B2

(12) United States Patent
Kim et al.

(10) Patent No.: US 9,500,786 B2
(45) Date of Patent: Nov. 22, 2016

(54) STEREOSCOPIC IMAGE DISPLAY COMPRISING COLOR FILTERS HAVING A DUMMY PART OVERLAPPING A PORTION OF A PLURALITY OF BLACK STRIPES

(71) Applicant: LG Display Co., Ltd., Seoul (KR)

(72) Inventors: Jinyeong Kim, Paju-si (KR); Heeyoung Chae, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 109 days.

(21) Appl. No.: 14/105,719

(22) Filed: Dec. 13, 2013

(65) Prior Publication Data

US 2014/0240625 A1    Aug. 28, 2014

(30) Foreign Application Priority Data

Feb. 28, 2013 (KR) ........................ 10-2013-0021784

(51) Int. Cl.
*G02B 27/26* (2006.01)
*H04N 13/04* (2006.01)
*G02B 5/20* (2006.01)

(52) U.S. Cl.
CPC .............. *G02B 5/201* (2013.01); *G02B 27/26* (2013.01); *H04N 13/0422* (2013.01); *H04N 13/0434* (2013.01)

(58) Field of Classification Search
CPC ... G02B 27/22; G02B 5/201; H04N 13/0422
USPC ........................................................ 349/15
See application file for complete search history.

(56) References Cited

U.S. PATENT DOCUMENTS

| 2005/0105017 A1 | 5/2005 | Choi et al. |
| 2007/0178390 A1* | 8/2007 | Yun ........................ G02B 5/201 430/5 |
| 2012/0019744 A1* | 1/2012 | Lee ........................ G02B 5/3083 349/65 |

FOREIGN PATENT DOCUMENTS

| CN | 101149542 A | 3/2008 |
| CN | 102346333 A | 2/2012 |
| CN | 102799020 A | 11/2012 |
| KR | 100860523 B1 | 4/2004 |

OTHER PUBLICATIONS

Chinese First Office Action, Chinese Application No. 201310664954.8, Mar. 4, 2016, 13 pages.

* cited by examiner

*Primary Examiner* — Paul Lee
(74) *Attorney, Agent, or Firm* — Fenwick & West LLP (57) ABSTRACT

The present invention has been made in an effort to provide a stereoscopic image display comprising: a liquid crystal panel comprising a lower substrate and an upper substrate; RGB color filters positioned on a first surface of the upper substrate; thin film transistors positioned on a first surface of the lower substrate; a black matrix positioned on a second surface of the upper substrate; and a patterned retarder film for separating an image displayed on the liquid crystal panel, wherein at least one of the RGB color filters has a dummy part overlapping at least a portion of one or both of the other color filters.

10 Claims, 13 Drawing Sheets

STEREOSCOPIC IMAGE DISPLAY COMPRISING COLOR FILTERS HAVING A DUMMY PART OVERLAPPING A PORTION OF A PLURALITY OF BLACK STRIPES

This application claims the benefit of Korean Patent Application No. 10-2013-0021784 filed on Feb. 28, 2013, which is incorporated herein by reference for all purposes as if fully set forth herein.

BACKGROUND

Field

This document relates to a stereoscopic image display and a method of manufacturing the same.

Related Art

A stereoscopic image display may be classified into a stereoscopic technique and an autostereoscopic technique. The stereoscopic technique, which uses a parallax image between left and right eyes of a user with a high stereoscopic effect, includes a glasses type method and a non-glasses type method, both of which have been put to practical use.

In the glasses type method, the parallax image between the left and right eyes is displayed on a direct-view display or a projector through a change in a polarization direction of the parallax image or in a time division manner, and thus the user views a stereoscopic image using polarization glasses or liquid crystal shutter glasses. In the non-glasses type method, an optical plate such as a parallax barrier for separating an optical axis of the parallax image between the left and right eyes is generally installed in front of or behind a display screen.

Some stereoscopic image displays use liquid crystal panels. Among these stereoscopic image displays, where a black matrix is conventionally formed inside a liquid crystal panel, stereoscopic image displays having a black matrix formed outside a liquid crystal panel have been recently proposed in order to reduce crosstalk effects and improve viewing angle.

The above-proposed stereoscopic image displays, however, present the problem of light leakage in regions corresponding to thin film transistors formed in the liquid crystal panel. To solve this problem, the design of the thin film transistors or the related wires may be changed. However, this approach has difficulties in terms of structure and cost. Thus, it is necessary to find a way to prevent light leakage when forming a black matrix outside a liquid crystal panel, as described above, in a conventional stereoscopic image display.

SUMMARY

The present invention has been made in an effort to provide a stereoscopic image display comprising: a liquid crystal panel comprising a lower substrate and an upper substrate; RGB color filters positioned on a first surface of the upper substrate; thin film transistors positioned on a first surface of the lower substrate; a black matrix positioned on a second surface of the upper substrate; and a patterned retarder film for separating an image displayed on the liquid crystal panel, wherein at least one of the RGB color filters has a dummy part overlapping a portion of at least one of the other color filters.

In another aspect, the present invention provides a method of manufacturing a stereoscopic image display, the method comprising: forming thin film transistors on a lower substrate; forming RGB color filters on a first surface of an upper substrate, at least one of the RGB color filters having a dummy part overlapping a portion of at least one of the other color filters; forming a black matrix on a second surface of the upper substrate; preparing a liquid crystal panel by forming a liquid crystal layer between the lower substrate and the upper substrate and bonding the lower and upper substrates together; and positioning a patterned retarder film on the second surface of the upper substrate.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 16 is a top planar view showing the RGB color filters of FIG. 15; and

DETAILED DESCRIPTION

Reference will now be made in detail to embodiments of the invention, examples of which are illustrated in the accompanying drawings.

Hereinafter, a concrete exemplary embodiment of the present invention will be described with reference to the accompanying drawings.

First Exemplary Embodiment

Figure 1:
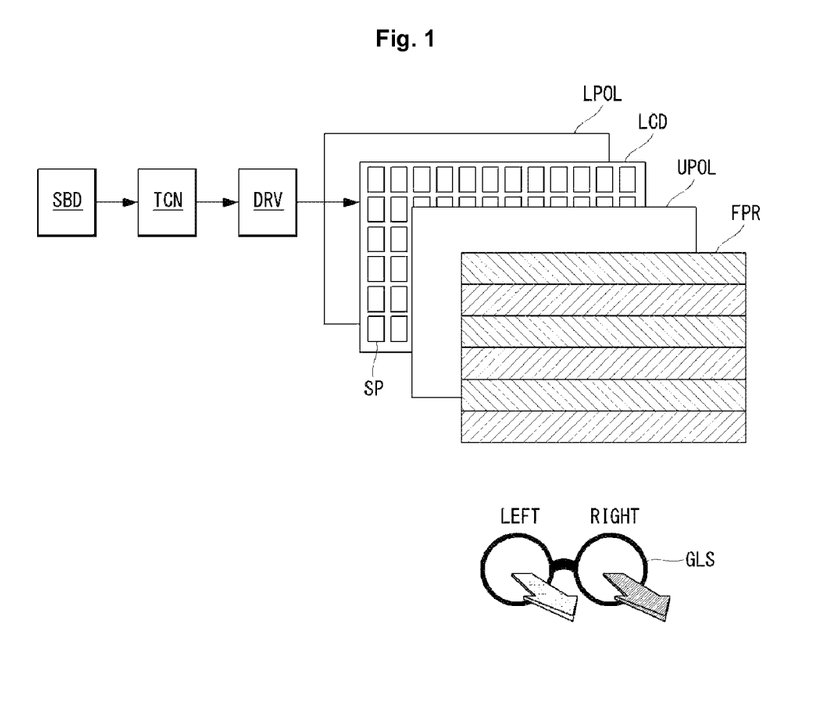
FIG. 1 is a schematic configuration view of a stereoscopic image display according to a first exemplary embodiment of the present invention.
Figure 2:
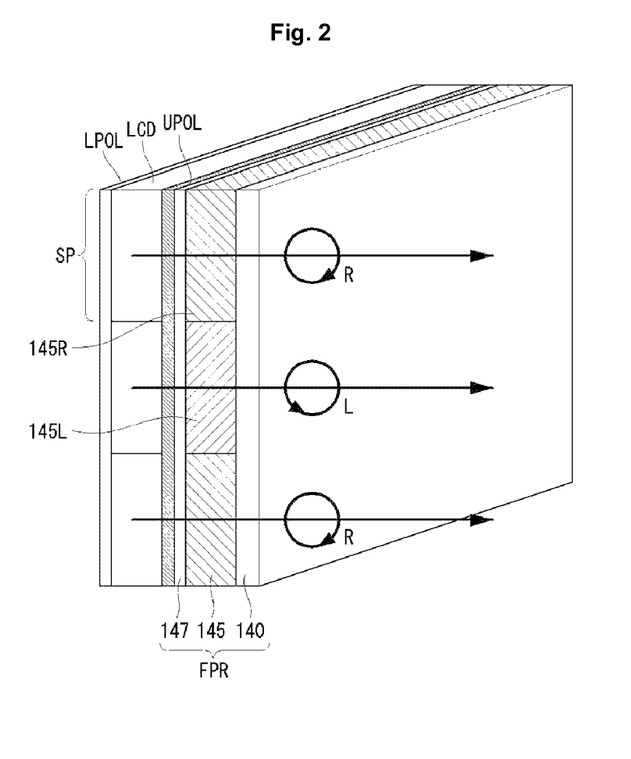
FIG. 2 is a schematic perspective view showing a liquid crystal panel and a patterned retarder film shown in FIG. 1.

FIG. 1 is a schematic configuration view of a stereoscopic image display according to a first exemplary embodiment of the present invention. FIG. 2 is a schematic perspective view showing a liquid crystal panel and a patterned retarder film shown in FIG. 1.

As illustrated in FIGS. 1 and 2, the stereoscopic image display according to the first exemplary embodiment of the present invention comprises an image supply unit SBD, a timing controller TCN, a driver DRV, a liquid crystal panel LCD, a patterned retarder film FPR, and polarized glasses GLS.

The image supply unit SBD produces 2D image frame data in a 2D mode and produces 3D image frame data in a 3D mode. The image supply unit SBD supplies timing signals, such as a vertical sync signal Vsync, a horizontal sync signal Hsync, a data enable DE, and a main clock, and image frame data to the timing controller TCN. The image supply unit SBD selects the 2D or 3D mode based on a user selection input through a user interface and produces the 2D or 3D image frame data corresponding to the selected 2D or 3D mode. The image supply unit SBD supplies the 2D or 3D image frame data to the timing controller TCN. The user interface comprises a user input device such as an on-screen display (OSD), a remote controller, a keyboard, and a mouse.

The timing controller TCN receives 3D image frame data including left eye image frame data and right eye image frame data from the image supply unit SBD. The timing controller TCN alternately supplies the left eye image frame data and the right eye image frame data to the driver DRV at a frame frequency equal to or greater than 120 Hz. Further, the timing controller TCN supplies a control signal corresponding to the image frame data to the driver DRV.

The driver DRV comprises a data driver, which is connected to data lines and supplies a data signal, and a scan driver, which is connected to scan lines and supplies a scan signal. The driver DRV converts digital type left and right eye image frame data into analog type left and right eye image frame data under the control of the timing controller TCN and supplies the analog type left and right eye image frame data to the data lines. The driver DRV sequentially supplies the scan signal to the scan lines under the control of the timing controller TCN.

The liquid crystal panel LCD receives the gate signal and the data signal from the driver DRV, and displays a 2D image or a 3D image corresponding to the scan signal and the data signal. A lower polarizer LPOL and an upper polarizer UPOL are respectively attached to the lower and upper parts of the liquid crystal panel LCD. The liquid crystal panel LCD displays a 2D image in the 2D mode and a 3D image in the 3D mode by using light provided by a backlight unit.

The patterned retarder film FPR comprises a bonding layer 147, a retarder layer 145, and a protective film 140. The retarder layer 145 comprises a first retarder pattern layer 145R and a second retarder pattern layer 145L. The retarder layer 145 is split into a first retarder pattern layer 145R for producing first polarized light (e.g., right circularly-polarized light) R and a second retarder pattern layer 145L for producing second polarized light (e.g., left circularly-polarized light) L by using a polarized light splitter BL. The first and second retarder pattern layers 145R and 145L are segmented by gate lines of sub-pixels SP of the liquid crystal panel LCD. Using the first and second retarder pattern layers 145R and 145L, the patterned retarder film FPR polarizes odd-numbered lines by the right circularly-polarized light R and even-numbered lines by the left circularly-polarized light L (or vice versa) and separates an image displayed on the liquid crystal panel LCD into a left-eye image and a right-eye image. That is, the patterned retarder film FPR mixes the left-eye image and right-eye image displayed on the liquid crystal panel LCD line by line, thereby displaying an image in an interlaced manner.

The polarized glasses GLS separate the image emitted through the patterned retarder film FPR into the left-eye image and the right-eye image. To this end, a left eyeglass LEFT of the polarized glasses GLS comprises a polarization film that transmits the left-eye image therethrough, and a right eyeglass RIGHT of the polarized glasses GLS comprises a polarization film that transmits the right-eye image therethrough.

Figure 3:
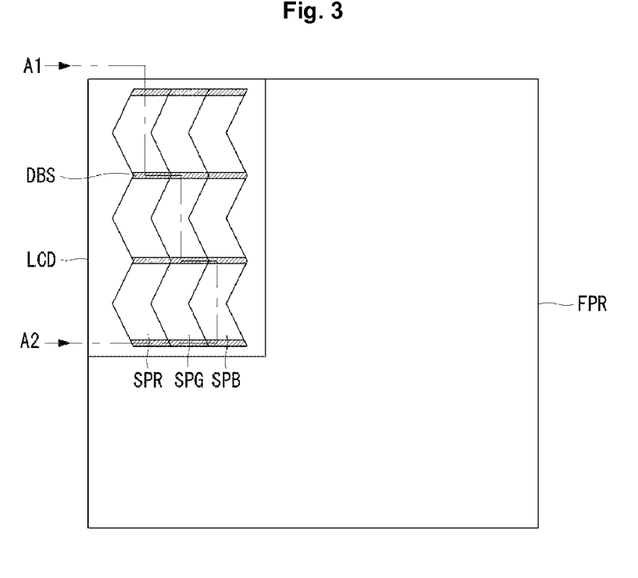
FIG. 3 is a top plan view of the liquid crystal panel of FIG. 2.
Figure 4:
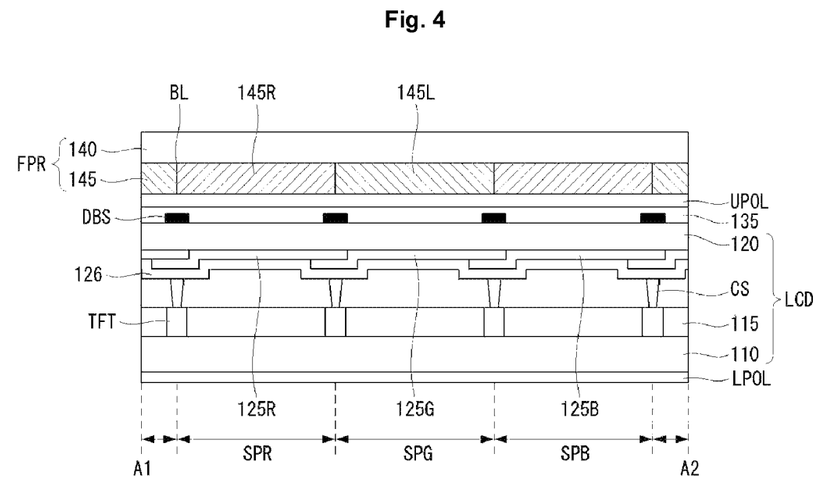
FIG. 4 is a cross-sectional view of area A1-A2 of the liquid crystal panel of FIG. 3.

FIG. 3 is a top planar view of the liquid crystal panel of FIG. 2. FIG. 4 is a cross-sectional view of area A1-A2 of the liquid crystal panel of FIG. 3.

As illustrated in FIGS. 3 and 4, the liquid crystal panel LCD comprises a lower polarizer LPOL; a lower substrate 110; a thin film transistor array 115; column spacers CS; red, green, and blue (RGB) color filters 125R, 125G, and 125B, respectively; an overcoating layer 126; an upper substrate 120; black stripes DBS; and an upper polarizer UPOL.

Thin film transistors TFT connected to data lines (not shown), gate lines, and storage capacitors are formed on a first surface (or inner surface) of the lower substrate 110. The thin film transistors TFT connected to the data lines, gate lines, and storage capacitors are formed separately for each of RGB sub-pixel regions. The lower polarizer LPOL is attached onto a second surface (or outer surface) of the lower substrate 110.

The RGB color filters 125R, 125G, and 125B for converting light emitted from the RGB sub-pixels SPR, SPG, and SPB into red, green, and blue beams are formed on the first surface (or inner surface) of the upper substrate 120. The overcoating layer 126 is formed on the RGB color filters 125R, 125G, and 125B. The column spacers CS are formed on the overcoating layer 126. The column spacers CS serve to maintain a cell gap between the lower substrate 110 and the upper substrate 120. The column spacers CS are formed corresponding to the regions where the thin film transistors TFT are positioned.

The black stripes DBS are formed on the second surface (or outer surface) of the upper substrate 120. The black stripes DBS are horizontally formed line by line together with the gate lines. The black stripes DBS are formed in a black color. An insulating layer 135 covering the black stripes DBS is formed on the second surface of the upper substrate 120. The upper polarizer UPOL is coupled to the insulating layer 135. An antistatic layer made of a transparent electrode, e.g., indium tin oxide (ITO), may be further formed between the insulating layer 135 and the upper polarizer UPOL, but is omitted here. The black stripes DBS may be formed immediately over the upper substrate 120, the insulating layer 135, or the upper polarizer UPOL.

A liquid crystal layer is formed between the lower substrate 110 and the upper substrate 120. The lower substrate 110 and the upper substrate 120 are bonded together and made into the liquid crystal panel LCD. The patterned retarder film FPR is positioned on the second surface of the upper substrate 120 that serves as the display surface of the liquid crystal panel LCD. The patterned retarder film FPR is attached onto the insulating film 135, the antistatic layer, or the upper polarizer UPOL.

At least one of the RGB color filters 125R, 125G, and 125B overlaps a portion of one or both of the other color filters. The overlap regions between the RGB color filters 125R, 125G, and 125B and portions of the other color filters correspond to the regions where the black stripes DBS and the column spacers CS are positioned. The RGB color filters 125R, 125G, and 125B partially overlap each other in order to prevent and block light leakage from the thin film transistors TFT (or regions adjacent to the thin film transistors) positioned corresponding to the black stripes DBS and the column spacers CS.

In the first exemplary embodiment of the present invention, the RGB color filters 125R, 125G, and 125B are formed as follows so that all the RGB color filters 125R, 125G, and 125B partially overlap each other at the positions where the thin film transistors TFT are formed, in order to prevent and block light leakage from the thin film transistors TFT (or regions adjacent to the thin film transistors).

Figure 5:
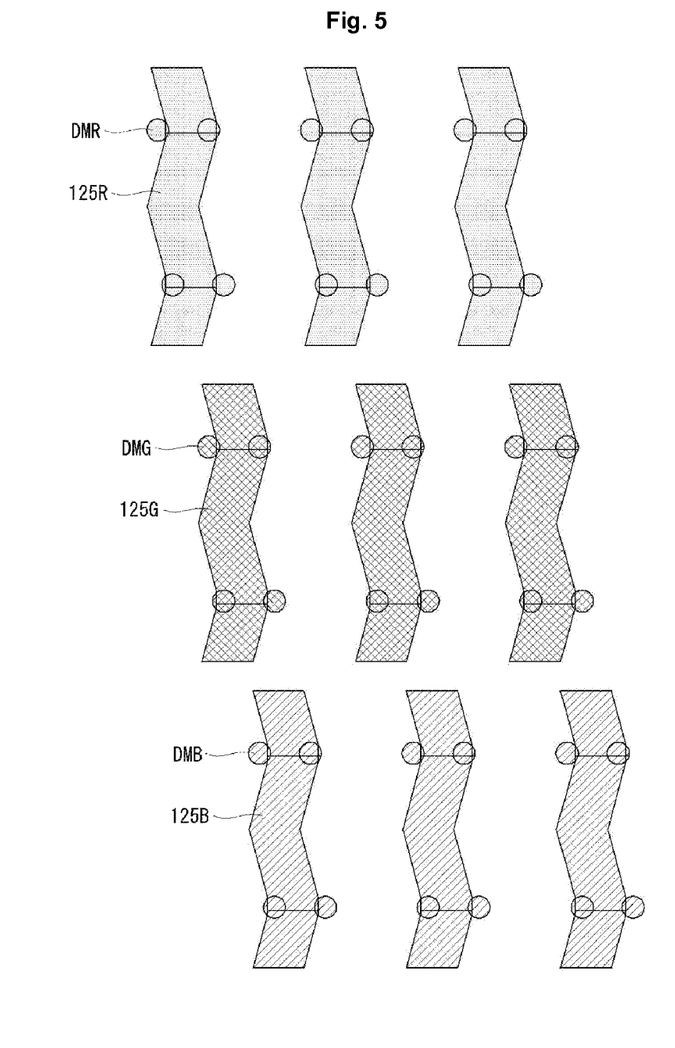
FIG. 5 is a top planar view showing RGB color filters separately according to the first exemplary embodiment of the present invention.
Figure 6:
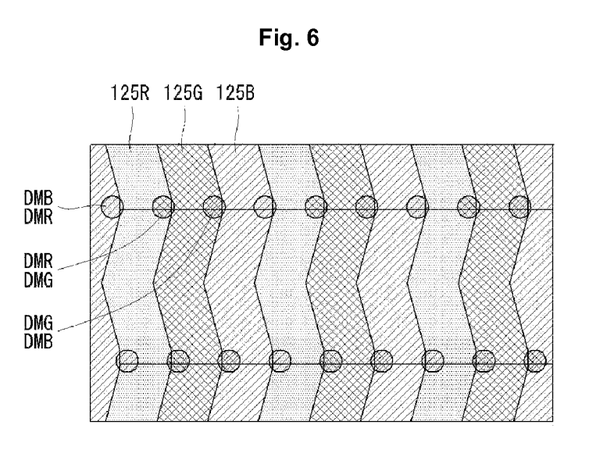
FIG. 6 is a top planar view showing the RGB color filters of FIG. 5.
Figure 7:
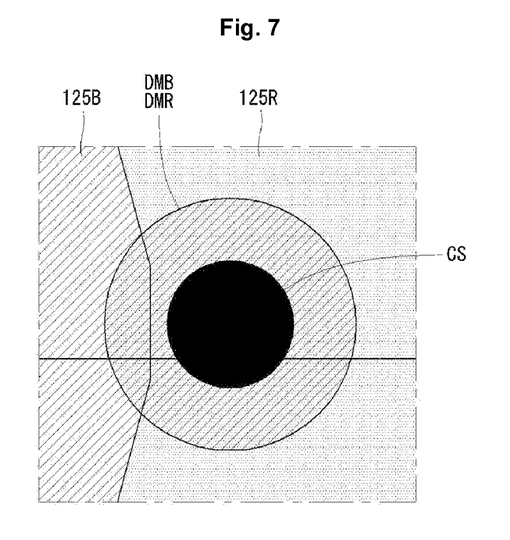
FIG. 7 is an enlarged view of a dummy part.

FIG. 5 is a top planar view showing RGB color filters separately according to the first exemplary embodiment of the present invention. FIG. 6 is a top planar view showing the RGB color filters of FIG. 5. FIG. 7 is an enlarged view of a dummy part.

As illustrated in FIG. 5, the RGB color filters 125R, 125G, and 125B are formed separately line by line in one direction (e.g., data line direction). In the drawing, an example is given of RGB color filters 125R, 125G, and 125B shaped like an inequality sign (<), which is protruded to the left from the center. However, the shape of the RGB color filters 125R, 125G, and 125B corresponds to the shape of openings of the sub-pixels. Accordingly, the shape of the RGB color filters 125R, 125G, and 125B is not limited to this shape but may be formed in the shape of openings, including a rectangle, implemented in all kinds of liquid crystal panels.

The RGB color filters 125R, 125G, and 125B comprise dummy parts DMR, DMG, and DMB corresponding to the positions of the thin film transistors TFT. The dummy parts DMR, DMG, and DMB are protruded from the RGB color filters 125R, 125G, and 125B. In the example shown in FIG. 5, the dummy parts DMR, DMG, and DMB are shaped like circles. The dummy parts DMR, DMG, and DMB are slightly protruded so as to partially overlap the other color filters.

The dummy parts DMR, DMG, and DMB protrude from alternating sides of the RGB color filters 125R, 125G, and 125B. That is, the dummy parts DMR, DMG, and DMB each comes in two pieces for each gate line. The dummy parts DMR, DMG, and DMB each have a protrusion on one side (e.g., the left side) and another protrusion on the other side (e.g., the right side), which alternate with each other every gate line. In one embodiment, the protrusion of one dummy part on the first gate line may be wider while the protrusion of the other dummy part on the first gate line may be narrower. In this case, the protrusion of one dummy part on the second gate line may be narrower while the protrusion of the other dummy part on the second gate line may be wider. However, this applies only when the positions of the thin film transistors TFT are different for each gate line, and the present invention is not limited to this.

As illustrated in FIG. 6, the dummy parts DMR, DMG, and DMB overlap each other in order to prevent and block light leakage from the thin film transistors TFT (or regions adjacent to the thin film transistors). The B dummy part DMB and the R dummy part DMR overlap each other in a region where the B color filter 125B and the R color filter 125R are adjacent to each other. The R dummy part DMR and the G dummy part DMG overlap each other in a region where the R color filter 125R and the G color filter 125G are adjacent to each other. The G dummy part DMG and the B dummy part DMB overlap each other in a region where the G color filter 125G and the B color filter 125B are adjacent to each other. While the illustrated drawing has been described with respect to an example in which color filters are formed in the order RGB, they may be formed in various orders like BRG or RBG.

As illustrated in FIG. 7, the B dummy part DMB and the R dummy part DMR are shaped like circles. This is because the column spacer CS formed in the overlap region of the B dummy part DMB and the R dummy part DMR has a circular shape and the B dummy part DMB and the R dummy part DMR therefore correspond to the shape of the column spacer CS. However, this is merely an example, and the dummy parts DMR, DMG, and DMB may have different shapes as follows.

Figure 8:
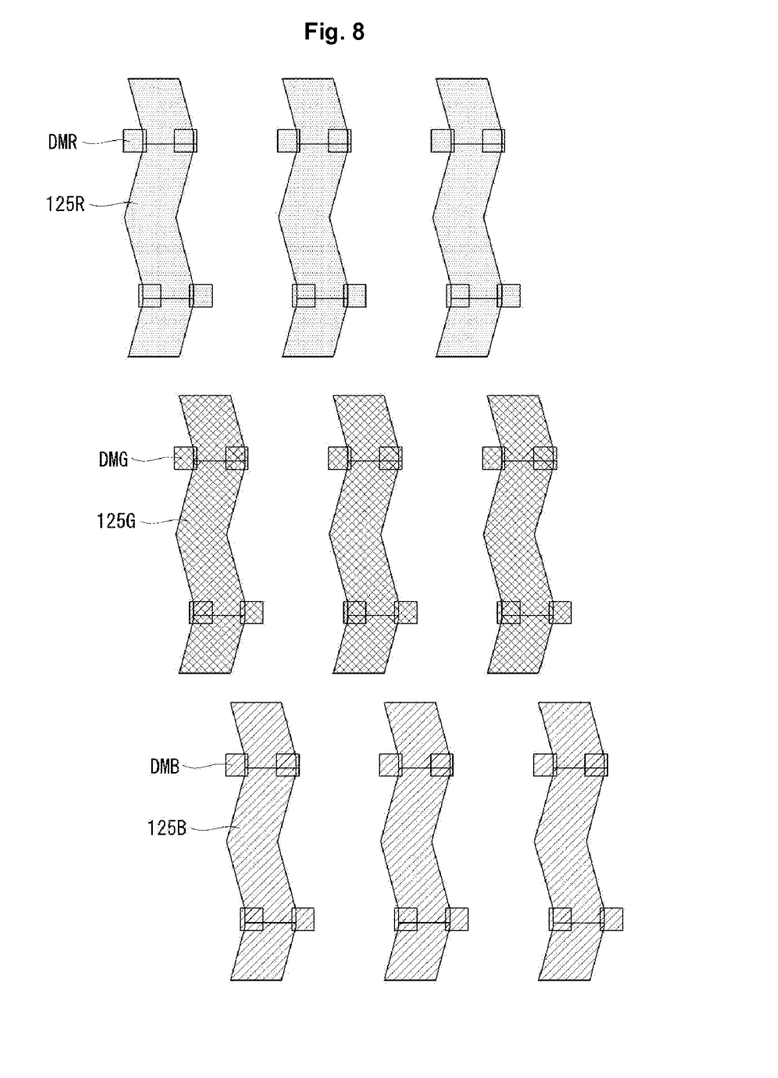
FIG. 8 is a top planar view showing RGB color filters separately according to a modification of the first exemplary embodiment.
Figure 9:
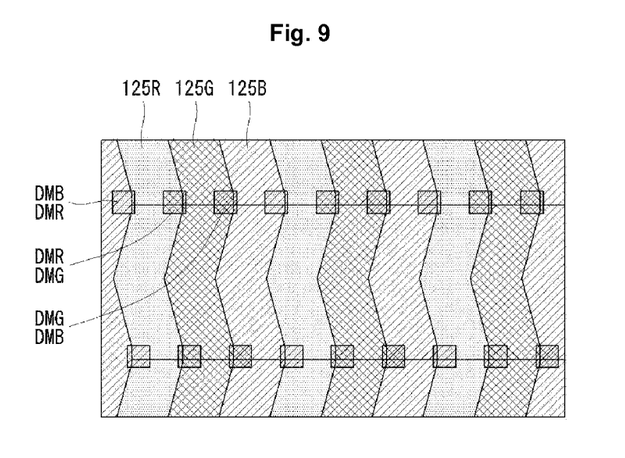
FIG. 9 is a top planar view showing the RGB color filters of FIG. 8.
Figure 10:
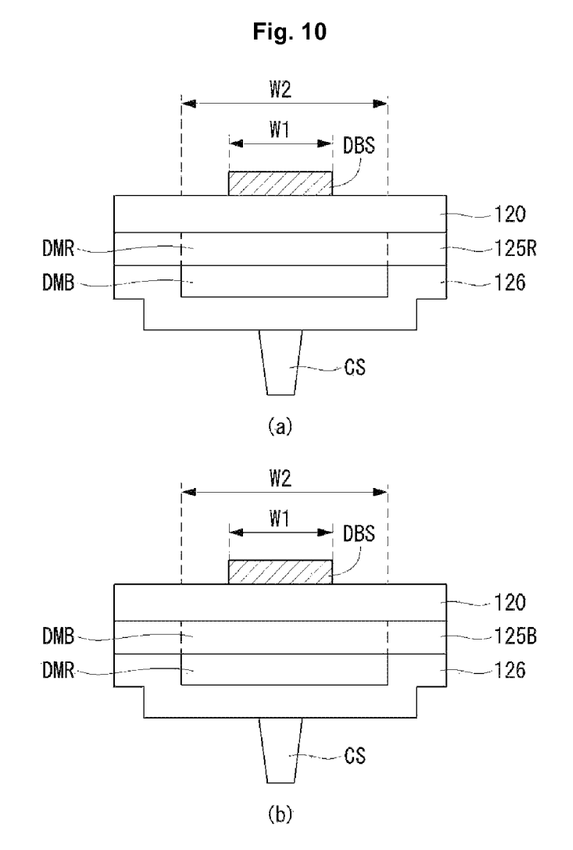
FIG. 10 shows enlarged cross-sectional views of a dummy part area.

FIG. 8 is a top planar view showing RGB color filters separately according to a modification of the first exemplary embodiment. FIG. 9 is a top planar view showing the RGB color filters of FIG. 8. FIG. 10 shows enlarged cross-sectional views of a dummy part area.

As illustrated in FIG. 8, the RGB color filters 125R, 125G, and 125B comprise dummy parts DMR, DMG, and DMB corresponding to the positions of the thin film transistors TFT. The dummy parts DMR, DMG, and DMB are protruded from the RGB color filters 125R, 125G, and 125B. In the example shown in FIG. 8, the dummy parts DMR, DMG, and DMB are formed in a square shape.

The dummy parts DMR, DMG, and DMB protrude from alternating sides of the RGB color filters 125R, 125G, and 125B. That is, the dummy parts DMR, DMG, and DMB each comes in two pieces for each gate line. The dummy parts DMR, DMG, and DMB each have a protrusion on one side (e.g., the left side) and another protrusion on the other side (e.g., the right side), which alternate with each other every gate line. In one embodiment, the protrusion of one dummy part on the first gate line may be wider while the protrusion of the other dummy part on the first gate line may be narrower. In this case, the protrusion of one dummy part on the second gate line may be narrower while the protrusion of the other dummy part on the second gate line may be wider. However, this applies only when the positions of the thin film transistors TFT are different for each gate line, and the present invention is not limited to this.

As illustrated in FIG. 9, the dummy parts DMR, DMG, and DMB overlap each other in order to prevent and block light leakage from the thin film transistors TFT (or regions adjacent to the thin film transistors). The B dummy part DMB and the R dummy part DMR overlap each other in a region where the B color filter 125B and the R color filter 125R are adjacent to each other. The R dummy part DMR and the G dummy part DMG overlap each other in a region where the R color filter 125R and the G color filter 125G are adjacent to each other. The G dummy part DMG and the B dummy part DMB overlap each other in a region where the G color filter 125G and the B color filter 125B are adjacent to each other. While the illustrated drawing has been described with respect to an example in which color filters are formed in the order RGB, they may be formed in various orders like BRG or RBG.

The above description has been made of an example in which the dummy parts DMR, DMG, and DMB are shaped like circles or squares. However, this is merely an example, and the dummy parts DMR, DMG, and DMB may be formed in a round, elliptical, square, or a polygonal shape, or a combination thereof.

As illustrated in FIG. 10, the R and B dummy parts DMR and DMB assist the black stripes DBS in preventing and blocking light leakage. Therefore, the R and B dummy parts DMR and DMB correspond to the width of the black stripes DBS, or are wider than the black stripes DBS as shown in the drawing. In the drawing, W1 indicates the width of the black stripes DBS, and W2 indicates the width of the R and B dummy parts DMR and DMB. While the drawing is illustrated that the R and B dummy parts DMR and DMB have the same width, they may have different widths. That is, the dummy parts may not correspond in width to each other on a 1:1 basis.

The B dummy part DMB may be formed after the R dummy part DMR is formed, as shown in FIG. 10(a), and the R dummy part DMR may be formed after the B dummy part DMB is formed, as shown in FIG. 10(b). That is, the positional relationship between the dummy parts in the overlap region may vary depending on which color filter is formed first.

Pigments used in the RGB color filters have different light transmission characteristics for each frequency range. As such, when one or more color filters overlap as described above, transmitted light beams are mixed together in the overlap region, thereby degrading the light transmission characteristics of a specific color and filtering this color. Therefore, forming RGB color filters as in the first exemplary embodiment can solve the problem of light leakage from the thin film transistors TFT (or regions adjacent to the thin film transistors) under the black stripes DBS.

Second Exemplary Embodiment

Figure 11:
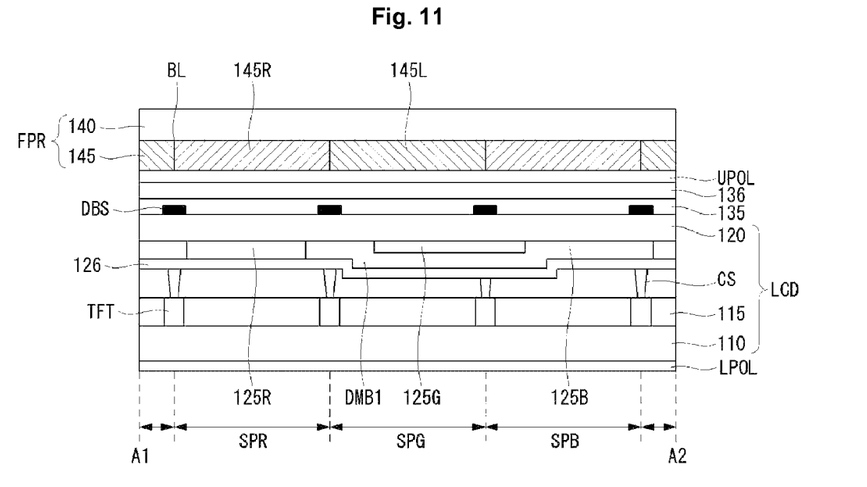
FIG. 11 is a cross-sectional view of area A1-A2 of the liquid crystal panel of FIG. 3.

FIG. 11 is a cross-sectional view of area A1-A2 of the liquid crystal panel of FIG. 3.

As illustrated in FIG. 11, the liquid crystal panel LCD comprises a lower polarizer LPOL, a lower substrate 110, a thin film transistor array 115, column spacers CS, RGB color filters 125R, 125G, and 125B, an overcoating layer 126, an upper substrate 120, black stripes DBS, and an upper polarizer UPOL.

Thin film transistors TFT connected to data lines (not shown), gate lines, and storage capacitors are formed on a first surface (or inner surface) of the lower substrate 110. The thin film transistors TFT connected to the data lines, gate lines, and storage capacitors are formed separately for each of RGB sub-pixel regions. The lower polarizer LPOL is attached onto a second surface (or outer surface) of the lower substrate 110.

The RGB color filters 125R, 125G, and 125B for converting light emitted from the RGB sub-pixels SPR, SPG, and SPB into red, green, and blue beams are formed on the first surface (or inner surface) of the upper substrate 120. The overcoating layer 126 is formed on the RGB color filters 125R, 125G, and 125B. The column spacers CS are formed on the overcoating layer 126. The column spacers CS serve to maintain a cell gap between the lower substrate 110 and the upper substrate 120. The column spacers CS are formed corresponding to the regions where the thin film transistors TFT are positioned.

The black stripes DBS are formed on the second surface (or outer surface) of the upper substrate 120. The black stripes DBS are horizontally formed line by line together with the gate lines. The black stripes DBS are formed in a black color. An insulating layer 135 covering the black stripes DBS is formed on the second surface of the upper substrate 120. The upper polarizer UPOL is coupled to the insulating layer 135. An antistatic layer made of a transparent electrode, e.g., ITO, may be further formed between the insulating layer 135 and the upper polarizer UPOL, but is omitted here. The black stripes DBS may be formed immediately over the upper substrate 120, the insulating layer 135, or the upper polarizer UPOL.

At least one of the RGB color filters 125R, 125G, and 125B overlaps a portion of one or both of the other color filters. The overlap regions between the RGB color filters 125R, 125G, and 125B and portions of the other color filters correspond to the regions where the black stripes DBS and the column spacers CS are positioned. The RGB color filters 125R, 125G, and 125B partially overlap each other in order to prevent and block light leakage from the thin film transistors TFT (or regions adjacent to the thin film transistors) positioned corresponding to the black stripes DBS and the column spacers CS.

In the second exemplary embodiment of the present invention, the RGB color filters 125R, 125G, and 125B are formed as follows so that the RGB color filters 125R, 125G, and 125B partially overlap each other at the positions where the thin film transistors TFT are formed, in order to prevent and block light leakage from the thin film transistors TFT (or regions adjacent to the thin film transistors).

Figure 12:
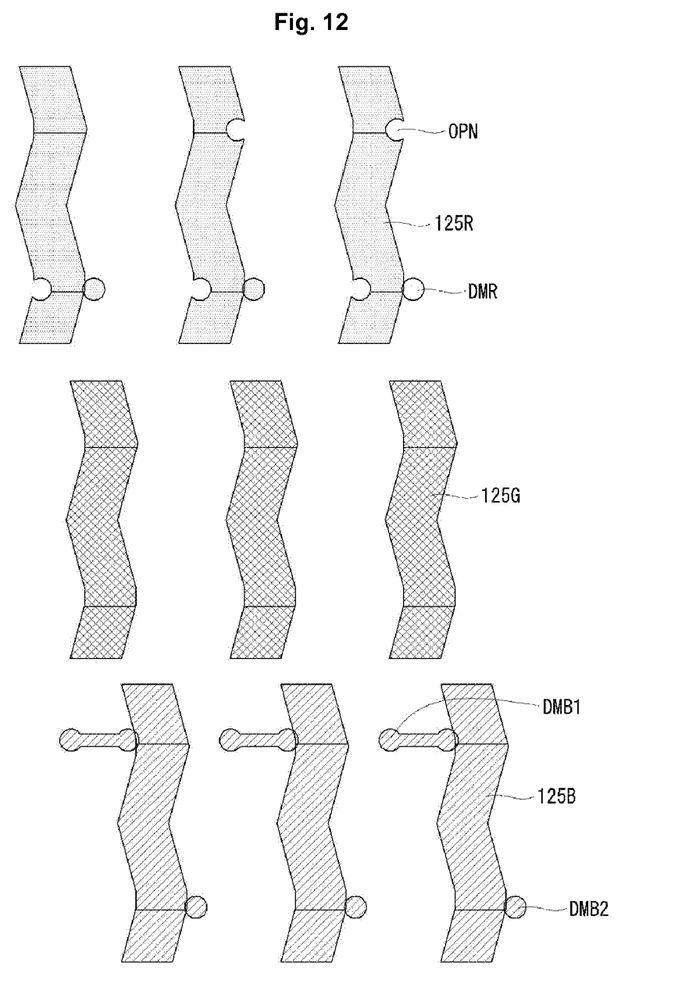
FIG. 12 is a top planar view showing RGB color filters separately according to a second exemplary embodiment of the present invention.
Figure 13:
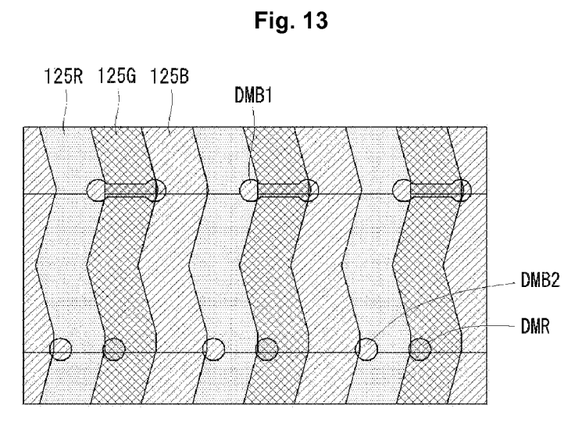
FIG. 13 is a top planar view showing the RGB color filters of FIG. 12.
Figure 14:
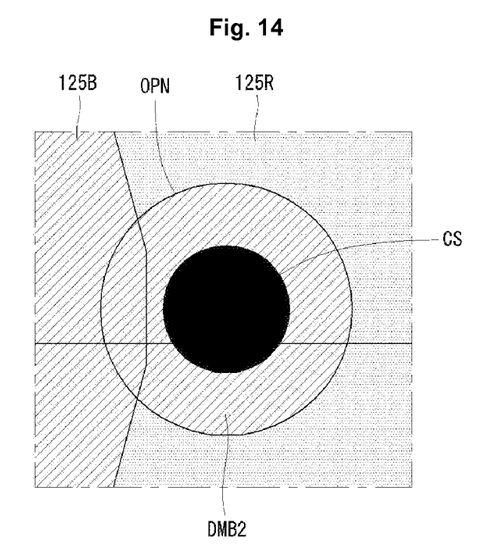
FIG. 14 is an enlarged view of a dummy part.

FIG. 12 is a top planar view showing RGB color filters separately according to the second exemplary embodiment of the present invention. FIG. 13 is a top planar view showing the RGB color filters of FIG. 12. FIG. 14 is an enlarged view of a dummy part.

As illustrated in FIG. 12, the RGB color filters 125R, 125G, and 125B are formed separately line by line in one direction (e.g., data line direction). In the drawing, an example is given of RGB color filters 125R, 125G, and 125B shaped like an inequality sign (<), which is protruded to the left from the center. However, the shape of the RGB color filters 125R, 125G, and 125B corresponds to the shape of openings of the sub-pixels. Accordingly, the shape of the RGB color filters 125R, 125G, and 125B is not limited to this shape but may be formed in the shape of openings, including a rectangle, implemented in all kinds of liquid crystal panels.

The R and B color filters 125R and 125B comprise dummy parts DMR and DMB corresponding to the positions of the thin film transistors TFT, and the G color filter 125G has no dummy part. The dummy parts DMR and DMB are protruded from the R and B color filters 125R and 125B. In the example shown in FIG. 12, the dummy parts DMR and DMB are shaped like circles.

The R dummy part DMR is protruded from the R color filter 125R to one side (e.g., right side). The R color filter 125R has an opening OPN patterned so as not to overlap the B dummy part DMB. Openings OPN are formed alternately on one side (e.g., left side) and then the other (e.g., right side) every gate line. The R color filter 125R has an opening OPN in a gate line while having another opening OPN and a dummy part DMB in the next gate line.

The B dummy part DMB comprises a 1B dummy part DMB1 extending to the position of the R color filter 125R and the position of the G color filter 125G and a 2B dummy part DMB2 protruded to the other side. While the 1B dummy part DMB1 and the G color filter 125G have an overlap region, the 1B dummy part DMB1 and the R color filter 125R have no overlap region. This is because one of the openings OPN of the R color filter 125R is occupied by the 1B dummy part DMB1. The B color filter 125B has a 1B dummy part DMB1 in a gate line while having a 2B dummy part DMB2 in the next gate line.

As illustrated in FIG. 13, the dummy parts DMR, DMG, and DMB overlap each other in order to prevent and block light leakage from the thin film transistors TFT (or regions adjacent to the thin film transistors). The R dummy part DMR and part of the G color filter 125G overlap each other in a region where the R color filter 125R and the G color filter 125G are adjacent to each other. Part of the G color filter 125G and the B dummy part DMB overlap each other in a region where the G color filter 125G and the B color filter 125B are adjacent to each other. The R dummy part DMR and part of the B color filter 125B overlap each other in a region where the B color filter 125B and the R color filter 125R are adjacent to each other. While the illustrated drawing has been described with respect to an example in which color filters are formed in the order RGB, they may be formed in various orders like BRG or RBG.

As illustrated in FIG. 14, the 2B dummy part DMB2 of the B color filter 125B and the opening OPN of the R color filter 125R are shaped like circles. This is because the column spacer CS formed in the overlap region of the 2B dummy part DMB2 and the opening OPN has a circular shape and the 2B dummy part DMB2 and the opening OPN therefore correspond to the shape of the column spacer CS. However, this is merely an example, and the 2B dummy part DMB2 and the opening OPN may have different shapes as follows.

Figure 15:
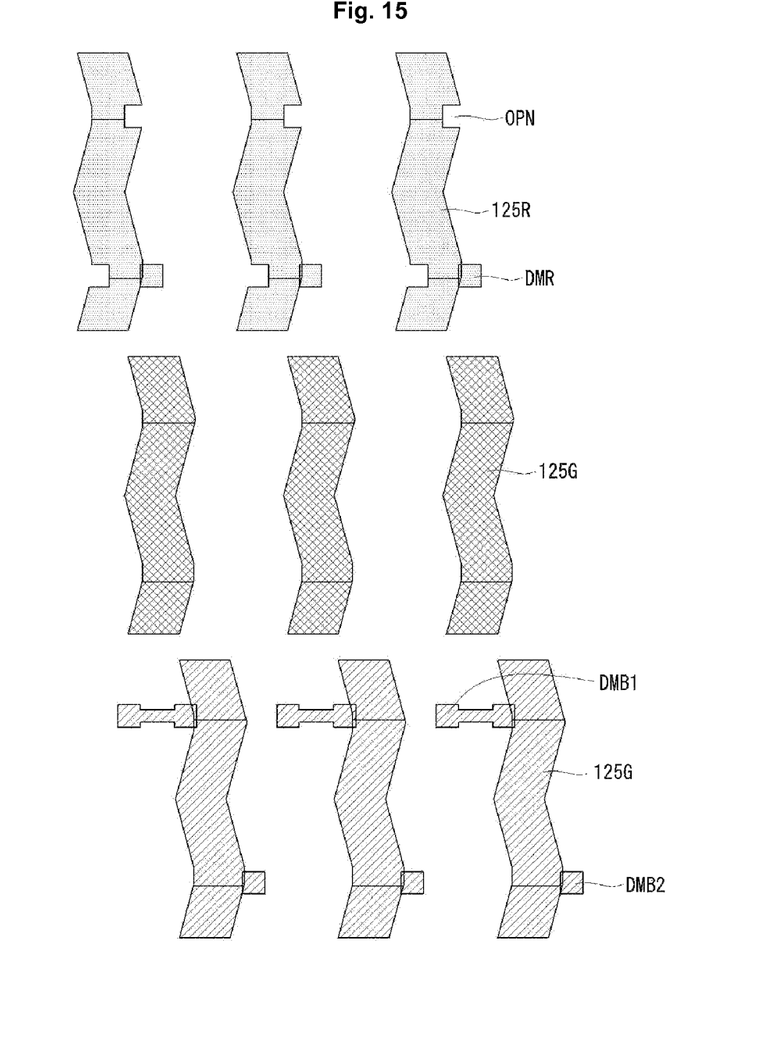
FIG. 15 is a top planar view showing RGB color filters separately according to a modification of the second exemplary embodiment.
Figure 17:
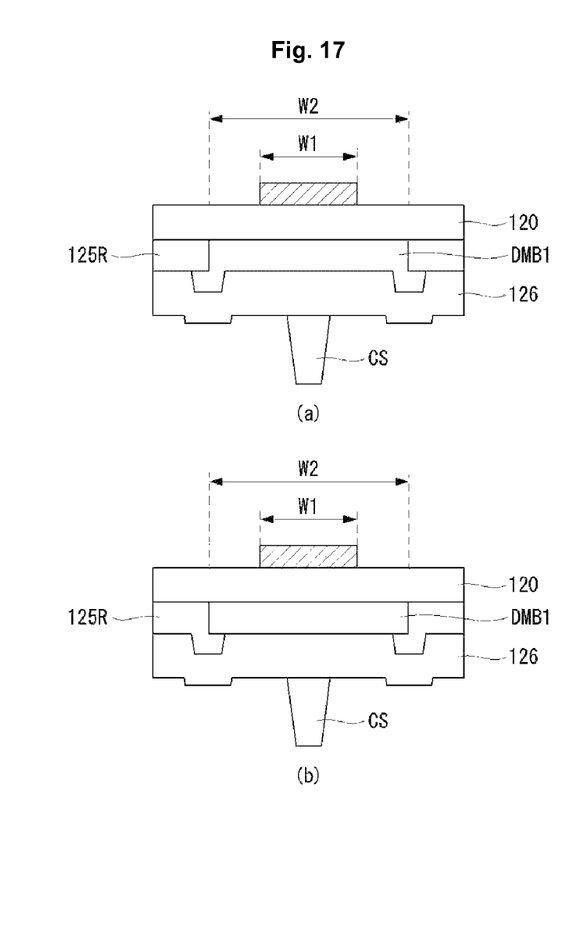
FIG. 17 shows enlarged cross-sectional views of a dummy part area.

FIG. 15 is a top planar view showing RGB color filters separately according to a modification of the second exemplary embodiment. FIG. 16 is a top planar view showing the RGB color filters of FIG. 15. FIG. 17 shows enlarged cross-sectional views of a dummy part area.

The R and B color filters 125R and 125B comprise dummy parts DMR and DMB corresponding to the positions of the thin film transistors TFT, and the G color filter 125G has no dummy part. The dummy parts DMR and DMB are protruded from the R and B color filters 125R and 125B. In the example shown in FIG. 15, the dummy parts DMR and DMB are shaped like squares.

The R dummy part DMR is protruded from the R color filter 125R to one side (e.g., right side). The R color filter 125R has an opening OPN patterned so as not to overlap the B dummy part DMB. Openings OPN are formed alternately on one side (e.g., left side) and then the other (e.g., right side) every gate line. The R color filter 125R has an opening OPN in a gate line while having another opening OPN and a dummy part DMB in the next gate line.

The B dummy part DMB comprises a 1B dummy part DMB1 extending to the position of the R color filter 125R and the position of the G color filter 125G and a 2B dummy part DMB2 protruded to the other side. While the 1B dummy part DMB1 and the G color filter 125G have an overlap region, the 1B dummy part DMB1 and the R color filter 125R have no overlap region. This is because one of the openings OPN of the R color filter 125R is occupied by the 1B dummy part DMB1. The B color filter 125B has a 1B dummy part DMB1 in a gate line while having a 2B dummy part DMB2 in the next gate line.

The above description has been made of an example in which the dummy parts DMR and DMB are shaped like circles or squares. However, this is merely an example, and the dummy parts DMR and DMB may be formed in a round, elliptical, square, or a polygonal shape, or a combination thereof.

As illustrated in FIG. 17, the 1B dummy part DMB1 assists the black stripes DBS in preventing and blocking light leakage. Therefore, the 1B dummy part DMB1 corresponds to the width of the black stripes DBS, or is wider than the black stripes DBS as shown in the drawing. In the drawing, W1 indicates the width of the black stripes DBS, and W2 indicates the width of the 1B dummy part DMB1.

The 1B dummy part DMB1 may be formed in the opening OPN which is provided after the R color filter 125R is formed, as shown in FIG. 17(a). Also, the opening OPN may be formed in the R color filter 125R after the 1B dummy part DMB1 is formed, as shown in FIG. 17(b).

Pigments used in the RGB color filters have different light transmission characteristics for each frequency range. As such, when one or more color filters overlap as described above, transmitted light beams are mixed together in the overlap region, thereby degrading the light transmission characteristics of a specific color and filtering this color. Especially, the frequency range of the pigment used in the B color filters is lower than those of the pigments used in the R and G color filters, and this pigment alone can have similar effects to those of the first exemplary embodiment. Therefore, forming RGB color filters as in the second exemplary embodiment can solve the problem of light leakage from the thin film transistors TFT (or regions adjacent to the thin film transistors) under the black stripes DBS.

As seen from above, the present invention provides a stereoscopic image display which can overcome the problem of light leakage in regions corresponding to thin film transistors (or in regions adjacent to thin film transistors) and improve viewing angle by changing the structure of color filters. Moreover, the present invention is easily applicable to mass-produced models because it blocks and prevents light leakage by using color filters, rather than wires, etc of a thin film transistor array. Furthermore, the present invention does not require design changes for implementing a light leakage prevention structure since only the shape of a mask used to form color filters needs to be changed.

What is claimed is:

1. A stereoscopic image display comprising:
a liquid crystal panel comprising a lower substrate and an upper substrate;
red, green, and blue (RGB) color filters positioned on a first surface of the upper substrate;
thin film transistors positioned on a first surface of the lower substrate;
a plurality of black stripes positioned on a second surface of the upper substrate and distributed across the upper substrate; and
a patterned retarder film for separating an image displayed on the liquid crystal panel,
wherein at least one of the RGB color filters has a dummy part overlapping a portion of at least one of the other color filters, and
wherein the dummy part overlaps at least a portion of one of the plurality of black stripes.

2. The stereoscopic image display of claim 1, wherein the dummy part overlaps a portion of one of the thin film transistors.

3. The stereoscopic image display of claim 1, wherein the dummy part is formed in all of the RGB color filters.

4. The stereoscopic image display of claim 1, wherein the dummy part comprises a plurality of protrusions from alternating sides of the RGB color filters.

5. The stereoscopic image display of claim 1, wherein the B color filter has a dummy part, and wherein the dummy part of the B color filter extends to the position of the R color filter and the position of the G color filter.

6. The stereoscopic image display of claim 5, wherein the R color filter has an opening patterned so as not to overlap the dummy part of the B color filter.

7. The stereoscopic image display of claim 6, wherein the G color filter has no dummy part.

8. The stereoscopic image display of claim 1, wherein the dummy part is formed in a round, elliptical, square, or polygonal shape.

9. The stereoscopic image display of claim 1, wherein a width of the dummy part is equal to or is greater than a width of the black stripes.

10. The stereoscopic image display of claim 1, wherein a width of the dummy part of one of the RGB color filters is same as or different from a width of the dummy part of another of the RGB color filters.

* * * * *